Patented Aug. 11, 1942

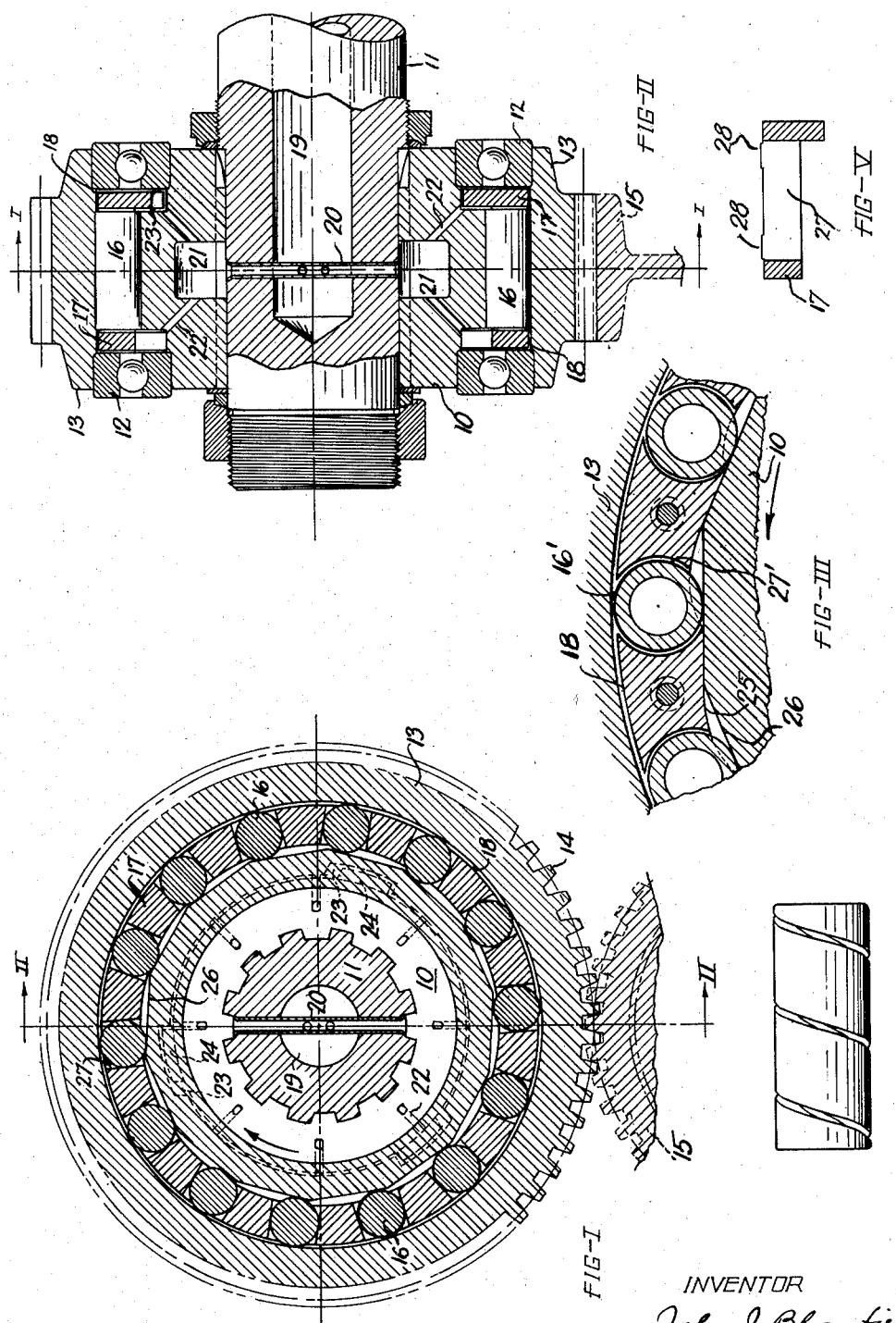

2,292,988

UNITED STATES PATENT OFFICE 2,292,988

ONE-WAY DRIVE CLUTCH

John J. Bloomfield, Los Angeles, and James B. Kendrick, Glendale, Calif., assignors, by mesne assignments, to Vega Aircraft Corporation, a corporation of California Application March 18, 1940, Serial No. 324,638

6 Claims. (Cl. 192—45)

This invention relates to one-way or overrunning clutches of the jamming roller type and more particularly to an improved roller cage therefor and a means whereby engagement and disengagement of the clutch is accomplished in a more efficient manner.

In the jamming roller type of one-way drive clutch, or free-wheeling clutch, it is necessary to provide a means which will cause the rollers to move into engagement in the drive direction and which will offer little or no resistance to movement in the opposite direction. In clutches of this type as have heretofore been used, the rollers have either been spring tensioned individually or as a group by means of a spring tensioned roller cage. Either of these methods, however, offers a slight resistance to free-wheeling motion due to the fact that the springs maintain the rollers in constant frictional contact with the surfaces of the cams and the race of the driving and driven elements. Such contact causes the rollers to spin at high velocity during free-wheeling and results in excessive wear on the rollers and the race and particularly on the cam surfaces of the driving element. It has been found that a decrease in the spring tension on the rollers will result in a corresponding decrease in such wear on the cam and other surfaces, which clearly indicates that if no springs were used, the wear, due to free-wheeling, would be negligible.

It is, therefore, among the objects of this invention to provide a springless roller cage which will operate to move all rollers either into or out of engagement simultaneously by means of the combined action of inertia and viscous drag; thus when the driving member is accelerated, inertia forces will cause the cage to lag and thereby move the rollers into engagement; while, if acceleration is negligible and there exists a relative velocity between the driving member and the driven member, the viscous drag between the roller cage and the driven member is alone sufficient to move the rollers either into or out of engagement.

Another advantage of this construction is that the viscous drag is equally effective in maintaining the disengagement of the clutch.

Another object of this invention is to provide an improved roller design which will automatically compensate for any misalignment between the driving element and the driven element, and which also will insure uniform roller engagement.

In the drawing forming a part of this description:

Figure I, a sectional view as indicated by the line I—I of Figure II, illustrates a one-way drive clutch embodying a roller cage according to our invention.

Figure II, a sectional view as indicated by the line II—II of Figure I, further illustrates the details of our improved construction.

Figure III is a fragmentary section showing a modified design of our improved roller cage and another method which we propose for limiting the movement of the cage with respect to the driving element.

Figure IV is an enlarged detail drawing of our improved roller design.

Figure V is a sectional view through the roller cage showing another modification of our improved roller cage design.

Referring to Figures I and II of the drawing, the embodiment shown comprises a cammed face hub or driving element 10 non-rotatably mounted upon a drive shaft 11 for clockwise rotation as indicated by the arrow. Concentric with the driving element 10 and supported upon bearings 12 is an outer race or driven element 13 provided with gear teeth 14 for transmitting the drive to other elements such as indicated at 15. Intermediate the driven element 13 and driving element 10 are a plurality of rollers 16 circumferentially spaced by the slots 27 in the roller cage 17. Except for the roller cage 17 and its functional relation to the mechanism, the parts thus far described are representative of conventional design.

Further describing the invention, it is to be noted that a relatively small clearance 18 is provided between the outer periphery of the roller cage 17 and inner periphery of the driven element 13. Lubricating liquid is preferably supplied to the mechanism through the axial passage 19 in the drive shaft 11, from which a laterally extending metering tube 20 conducts said liquid into the circumferential groove 21 within the driven element 10 and thence through the diverging passages 22 to the rollers 16 and the roller cage 17. This system of lubrication is particularly satisfactory, and dependable for the reason that, centrifugal action aids in forcing the thus supplied lubricant into the narrow clearance space 18 between the outer periphery of the roller cage and the inner surface of the race of the driven element 13. With a continuous supply of a lubricant of suitable viscosity filling said space 18, any relative movement between the driven element 13 and driving element 10 produces a viscous drag which acts to rotate the cage 17 relative to the driving element 10 and thus to move the rollers 16 to either engage or disengage the clutch. It will also be noted that the relative rotational movement between the driving element 10 and cage 17 is limited by the notches 23 and stops 24. Thus, in the disengaged position the rollers 16 are retained by the cage 17 and a position where they have maximum clearance between the adjacent cam and race surfaces of the driving and driven elements. As previously stated, when the driving element 10 is accelerated, the cage 17 by reason of its inertia tends to lag and thus aids the viscous drag in actuating the rollers.

In Figure III, we have shown a modified design in which the roller cage 17 instead of having notches as shown at 23 in Fig. I is provided with a plurality of cam surfaces 25 around its inner periphery complemental to the cam surfaces 26 on the driving element 10. In this view the driving element 10 is adapted to be driven counter-clockwise as indicated by the arrow. Thus, in the disengaged position as here illustrated the complemental cam surfaces 25 and 26 make contact and thereby limit the relative rotational movement of the cage 17 with respect to the driving element 10 thereby holding the rollers out of jamming engagement with the cammed surfaces of the driving element 10 and the inner surface of the race of the driven element 13. I have also shown circular slots 27' in the roller cage which provide increased roller bearing area and thus more resistance to roller cocking.

Figure V illustrates another modification in our roller cage design wherein the outer periphery thereof is provided with a plurality of raised surfaces 28 intermediate the slots 27. This design is particularly advantageous where the coefficient of expansion of the cage material is greater than that of the race material; in that, as the clutch heats the space 18 becomes smaller and under extreme conditions might contact the outer race 13. Thus, in the event contact does occur, the contacting area is considerably reduced. Furthermore, the raised surfaces 28 produce a small discontinuity of the outer surface of the cage 17 which acts to increase the viscous drag of the lubricating fluid body retained in the clearance space. While it will be understood that many materials are suitable for roller cages and that we do not desire to be limited in this respect, it has been found that a very satisfactory cage can be constructed from a material comprised of laminated fabric impregnated with a phenolic binder.

Figure IV illustrates an optional design of roller which by its resiliency is adapted to compensate for possible misalignment between the driving member 10 and driven member 13. This improved roller is preferably constructed from a flat metal strip and wound in the form of a helix as shown, however, in certain installations a hollow cylindrical roller, as indicated at 16' in Figure III, may be sufficiently resilient for the purpose. Another advantage gained from this design is that the engagement of all rollers will be more nearly simultaneous and uniform.

For explanatory purposes only, the cammed face element 10 has been termed the driving element and the outer race 13 the driven element, however, it is to be understood that either of said elements may obviously be the driving or driven element without in anywise altering the mode or principle of operation of the apparatus, and that such terminology as used in the claims is to be so construed.

Having thus described our invention and particularly pointed out wherein same is an improvement over prior construction, it is to be understood that such description is not to be limiting but is merely illustrative and that many modifications may obviously be employed within the scope of the claims.

We claim:

1. In a one-way drive clutch, a cammed face driving element, a driven element concentric with and in spaced relation to said driving element and mounted so as to rotate relative thereto, a plurality of rollers intermediate said driving and driven elements, a slotted roller cage also concentric to said driving element, and with its outer peripheral segments having a small clearance with the inner face of said driven element, said clearance space formed thereby being adapted to retain therein a thin body of oil intermediate the points of contact of the rollers with the inner surface of the driven element whereby said roller cage is forced to move simultaneously said plurality of rollers into jamming contact with said driving and driven elements by means of the combined action of inertia and the viscous drag of said oil body.

2. In a one-way drive clutch, the combination of a cammed driving element, a driven element concentric with said driving element, a plurality of rollers intermediate said driving and driven elements, a roller cage intermediate and concentric with both of said elements adapted to maintain said rollers in spaced relation, means associated with said cage to allow only limited relative rotational movement between said roller cage and said cammed driving element sufficient to move said rollers into jamming engagement with the cam surfaces of the said driving element upon relative rotation between said driving and driven elements in one direction and to move and maintain said rollers out of jamming contact and in spaced relationship with said adjacent cam surfaces upon relative rotation of said elements in the opposite direction, said limited movement of said roller cage being effected by combined inertia and fluid viscous drag.

3. In a one-way drive clutch, the combination of a rotatable cammed driving element, a rotatable driven element concentric with said driving element, a plurality of rollers intermediate said driving and driven elements, a roller cage intermediate and concentric with both of said elements and adapted to maintain said rollers in spaced relation, and means associated with said cammed driving element and said cage to allow only limited relative rotational movement between said roller cage and said cammed driving element sufficient to move said rollers into jamming engagement with the cam surfaces of the said driving element upon relative rotation between said driving and driven elements in one direction and to move and hold said rollers out of jamming contact with said cam surfaces upon relative rotation of said elements in the opposite direction.

4. In a one-way drive clutch, a cammed face driving element, a driven element concentric with and in spaced relation to said driving element and mounted so as to rotate relative thereto, a plurality of rollers intermediate said driving and driven elements, a slotted roller cage also concentric with said driving element, and with its outer peripheral segments having small clearance with the inner face of said driven element, said clearance space formed thereby being adapted to retain therein a thin body of oil intermediate the point of contact of the rollers with the inner surface of the driven element, means associated with said slotted cage and said driving element to impart rotation from said driving element to said cage but to allow limited relative rotational movement therebetween whereby said roller cage may be imparted rotational movement relative to said driving element sufficient to move simultaneously said plurality of rollers into jamming contact with said driving and driven elements upon relative rotation between said driving and driven elements in one direction and to move simultaneously and maintain said rollers out of jamming contact with said adjacent cam and driven element surfaces upon relative rotation of said elements in the opposite direction, said limited movement of said roller cage being effected by means of the combined action of inertia and the viscous drag of said oil body.

5. Apparatus according to claim 4 in which the said rollers are of uniform diameter.

6. In a one-way drive clutch, the combination in accordance with claim 2 in which the means associated with said cage to allow said roller cage and said cammed driving element comprises a plurality of cam surfaces formed on the inner periphery of the cage and adapted to engage the cam surfaces of the driving element.

JOHN J. BLOOMFIELD.
JAMES B. KENDRICK.